US006901327B2

(12) United States Patent
Bidner et al.

(10) Patent No.: US 6,901,327 B2

(45) **Date of Patent: *May 31, 2005**

(54) COMPUTER INSTRUCTIONS FOR CONTROL OF MULTI-PATH EXHAUST SYSTEM IN AN ENGINE

(75) Inventors: David Karl Bidner, Livonia, MI (US); Gopichandra Surnilla, West Bloomfield, MI (US); Michael John Cullen, Northville, MI (US); Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/716,693

(22) Filed: Nov. 18, 2003

(65) Prior Publication Data

US 2004/0187484 A1 Sep. 30, 2004

Related U.S. Application Data

(63) Continuation of application No. 10/401,055, filed on Mar. 27, 2003, now Pat. No. 6,754,578.

(51) Int. Cl.[7] .................................................. G05D 1/00

(52) U.S. Cl. ....................... 701/108; 701/109; 701/112; 701/114; 701/115; 123/481

(58) Field of Search ................................ 701/108, 109, 701/114, 112, 115; 123/481

(56) References Cited

U.S. PATENT DOCUMENTS

| | | | | |
|---|---|---|---|---|
| 4,467,602 A | | 8/1984 | Iizuka et al. | 60/276 |
| 4,515,121 A | | 5/1985 | Matsuura et al. | 123/198 F |
| 5,099,816 A | | 3/1992 | Ohga et al. | 123/481 |
| 5,241,855 A | | 9/1993 | Cullen et al. | 73/117.3 |
| 5,267,541 A | | 12/1993 | Taguchi et al. | 123/198 F |
| 5,351,776 A | | 10/1994 | Keller et al. | 701/70 |
| 5,368,000 A | | 11/1994 | Koziara | 123/481 |
| 5,492,094 A | | 2/1996 | Cullen et al. | 123/339.11 |
| 5,540,633 A | | 7/1996 | Yamanaka et al. | 477/107 |
| 5,558,178 A | | 9/1996 | Hess et al. | 180/197 |
| 5,562,086 A | | 10/1996 | Asada et al. | 123/521 |
| 5,579,736 A | | 12/1996 | Nakamura et al. | 477/107 |
| 5,584,266 A | | 12/1996 | Motose et al. | 123/73 A |
| 5,617,829 A | | 4/1997 | Bidner et al. | 123/481 |
| 5,657,230 A | | 8/1997 | Hess et al. | 364/431.052 |
| 5,669,357 A | | 9/1997 | Denz et al. | 123/481 |
| 5,673,668 A | | 10/1997 | Pallett et al. | 123/436 |
| 5,762,043 A | | 6/1998 | Yoshioka et al. | 123/325 |
| 5,797,371 A | | 8/1998 | Nonaka | 123/481 |
| 5,941,211 A | | 8/1999 | Brehob et al. | 123/325 |
| 5,941,925 A | | 8/1999 | Hess et al. | 701/91 |
| 6,039,023 A | | 3/2000 | Cullen et al. | 123/339.23 |
| 6,109,236 A | | 8/2000 | Takahashi et al. | 123/339.19 |
| 6,178,371 B1 | | 1/2001 | Light et al. | 701/93 |
| 6,250,282 B1 | | 6/2001 | Osaki et al. | 123/339.14 |
| 6,263,856 B1 | | 7/2001 | Weber et al. | 123/352 |
| 6,468,183 B1 | | 10/2002 | O'Neil et al. | 477/107 |
| 6,506,140 B1 | | 1/2003 | O'Neil et al. | 477/62 |
| 6,516,778 B1 | | 2/2003 | Light et al. | 123/352 |
| 6,754,578 B1 | * | 6/2004 | Bidner et al. | 701/108 |

* cited by examiner

*Primary Examiner*—Tony M. Argenbright
*Assistant Examiner*—Johnny H. Hoang
(74) *Attorney, Agent, or Firm*—Allan J. Lippa; Alleman Hall McCoy Russell & Tuttle LLP

(57) ABSTRACT

A computer controller is described for disabling fuel injection into cylinder groups of an engine. The system controls engine output a reduced engine torques without reducing engine air amounts below an engine misfire amount by reducing the number of cylinders carrying out combustion. Engine airflow is controlled to maintain accurate torque at requested levels throughout engine operating ranges.

13 Claims, 5 Drawing Sheets

COMPUTER INSTRUCTIONS FOR CONTROL OF MULTI-PATH EXHAUST SYSTEM IN AN ENGINE

CROSS-REFERENCE TO RELATED APPLICATIONS

This application is a continuation of and claims priority to application Ser. No. 10/401,055, filed on Mar. 27, 2003, now U.S. Pat. No. 6,754,578, entitled "computer instructions for control of multi-path exhaust system in an engine", assigned to the same assignee as the present application, and incorporated herein by reference in its entirety.

BACKGROUND AND SUMMARY OF THE INVENTION

During vehicle deceleration, low engine torque is commonly requested to maintain a good drivability with controlled deceleration. However, the lowest torque that the engine produce during this mode is limited by the misfire limit of the engine. Typically, the engine has to be operated above a threshold load to reduce low load misfires. One way to reduce the engine torque output under the minimum load constraint is to operate the engine with only some of the cylinders firing while the remaining cylinders pump air without injected fuel. However, in a system that is to maintain stoichiometric operation with a three-way catalyst (TWC), when only some cylinders are fired, the air from the non-firing cylinders makes the exhaust air-fuel ratio mixture lean and can also saturate the exhaust system with oxygen. Under these conditions, the TWC has a degraded NOx conversion efficiency and hence the NOx coming from the firing stoichiometric cylinders may not be reduced. This can cause large NOx emissions. As a result, such a control system results in only minimal use of cylinder deactivation.

One solution would be to utilize a NOx trap to treat the mixture of combusted and non-combusted gasses. However, this can add significant cost and may not be able to meet emission requirements for all engine applications.

Another method to overcome the above disadvantages is to utilize a computer readable storage medium having stored data representing instructions executable by a computer to control an internal combustion engine of a vehicle, said engine having at least a first and second group of cylinders, with a first emission control device coupled exclusively to said first group of cylinders and a second emission control device coupled to said second group of cylinders, said storage medium comprising:

instructions for determining a requested engine output;

instructions for operating both the first and second group of cylinders near stoichiometry in first region and adjusting at least airflow to provide said requested engine output; and instructions for operating said first group near stoichiometry and second group without injected fuel in second region where said engine output request is lower than in said first region, adjusting at least airflow to said first group to provide said requested engine output.

In this way, it is possible to operate with reduced numbers of cylinders carrying out combustion while, and thereby provide engine reduced engine output without passing the engine misfire limit, while at the same time maintain low emissions since excess oxygen does not dilute the combusted gasses fed to an exhaust system emission control device.

Note that, in one example, the emission control devices utilized are three way catalysts. However, other devices could be used. Further, additional emission control devices could be used. Note also that the first and second cylinder groups can have equal or unequal cylinder numbers and can have only one cylinder in the group.

Advantages of the above aspects of the present invention are a fuel economy improvement with reduced costs and a reduced NOx or CO/HC emissions impact. Further, improved drivability is obtained by reducing the drive feel associated with constraints imposed by the minimum misfire load limits of the engine.

DETAILED DESCRIPTION

Figure 1:
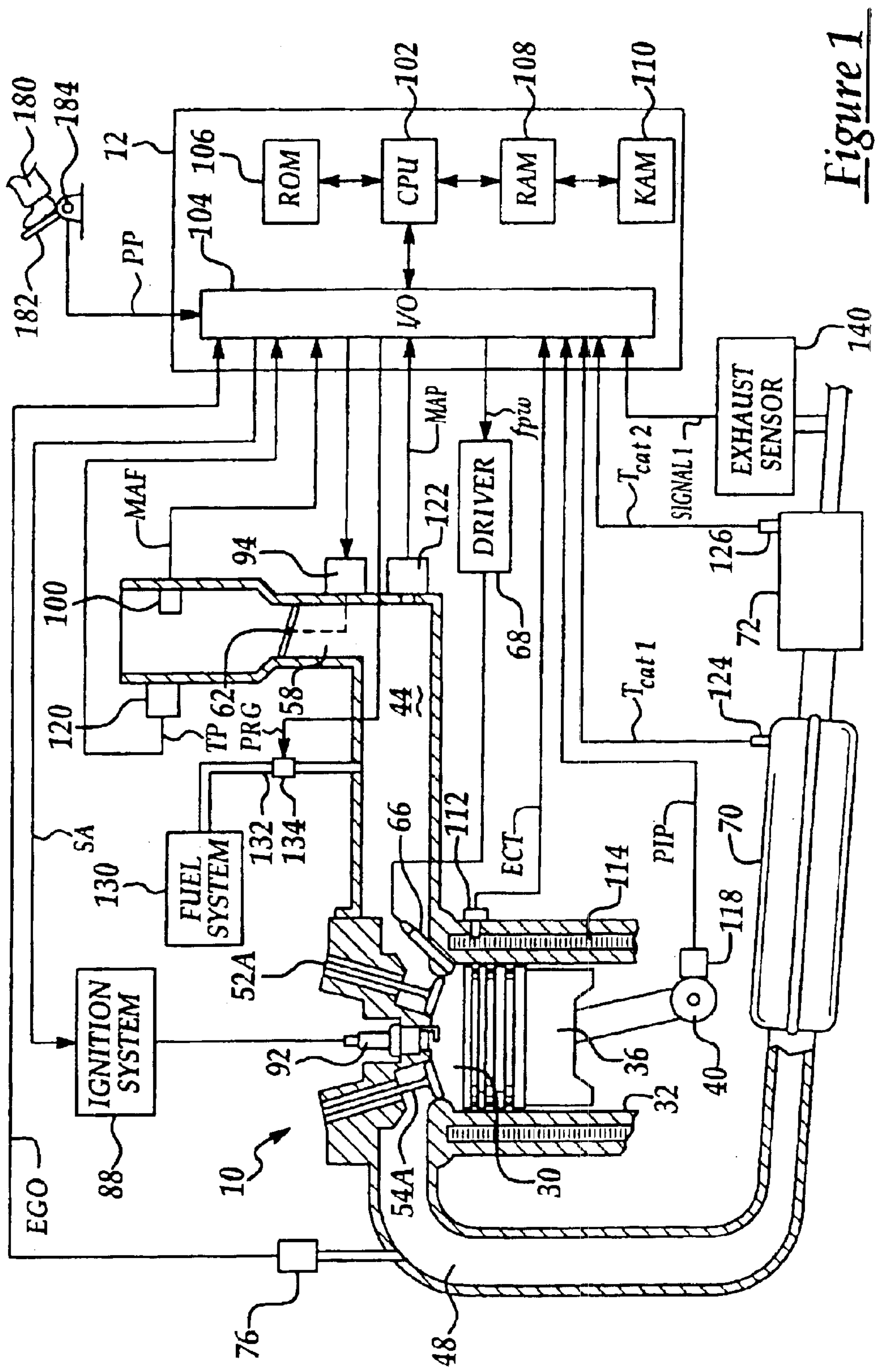
FIG. 1 show an engine system configuration according to an example embodiment of the invention.

Direct injection spark ignited internal combustion engine 10, comprising a plurality of combustion chambers, is controlled by electronic engine controller 12. Combustion chamber 30 of engine 10 is shown in FIG. 1 including combustion chamber walls 32 with piston 36 positioned therein and connected to crankshaft 40. In this particular example piston 36 includes a recess or bowl (not shown) to help in forming stratified charges of air and fuel. Combustion chamber 30 is shown communicating with intake manifold 44 and exhaust manifold 48 via respective intake valves 52*a* and 52*b* (not shown), and exhaust valves 54*a* and 54*b* (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control and airflow/torque control. In an alternative embodiment (not shown), a bypass air passageway is arranged in parallel with throttle late 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry, referred to herein as near stoichiometry, during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66 during the engine compression stroke so that fuel is sprayed directly into the bowl of piston 36. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air/fuel mixture is formed when ignition power is supplied to spark plug 92 by ignition system 88. Controller 12 controls the amount of fuel delivered by fuel injector 66 so that the homogeneous air/fuel mixture in chamber 30 can be selected to be at stoichiometry, a value rich of stoichiometry, or a value lean of stoichiometry. Controller 12 adjusts fuel injected via injector 66 based on feedback from exhaust gas oxygen sensors (such as sensor 76) to maintain the engine air-fuel ratio at a desired air-fuel ratio.

Second emission control device, is shown positioned downstream of the first emission control device 70. Devices 70 and 72 each contain catalyst of one or more bricks. However, in an alternative embodiment, devices 70 and 72 can be different bricks in the same canister or separately packaged. In one embodiment, devices 70 and 72 are three-way catalytic converters.

Controller 12 is shown in FIG. 1 as a conventional microcomputer including: microprocessor unit 102, input/output ports 104, an electronic storage medium for executable programs, calibration values and, any other computer instructions shown as read only memory chip 106 in this particular example, random access memory 108, keep alive memory 110, and a conventional data bus. Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperature T1 of device 70 and temperature T2 of device 72 are inferred from engine operation. In an alternate embodiment, temperature T1 is provided by temperature sensor 124 and temperature T2 is provided by temperature sensor 126.

In another alternative embodiment, a port fuel injected engine can be used where injector 66 is positioned in intake manifold 44 to injected fuel toward valve **52*a* and chamber 30**.

Figure 2A:
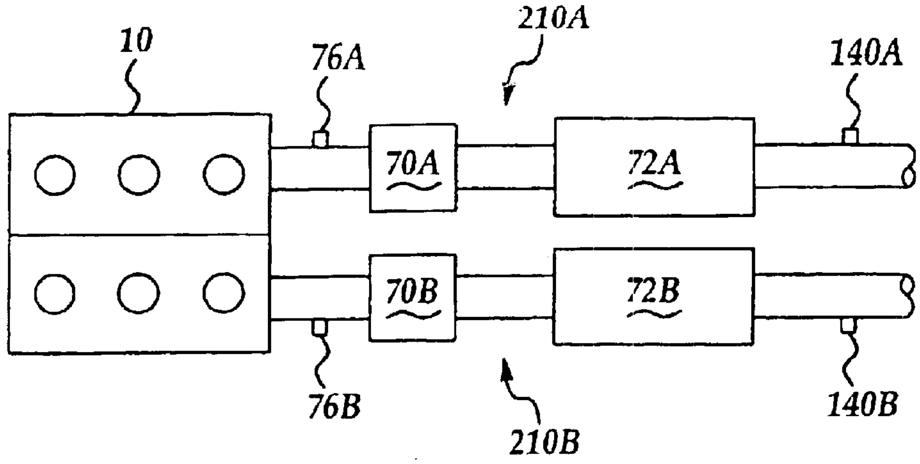
FIGS. 2A–C show alternative exhaust configuration according to other example embodiments of the invention.
Figure 2B:
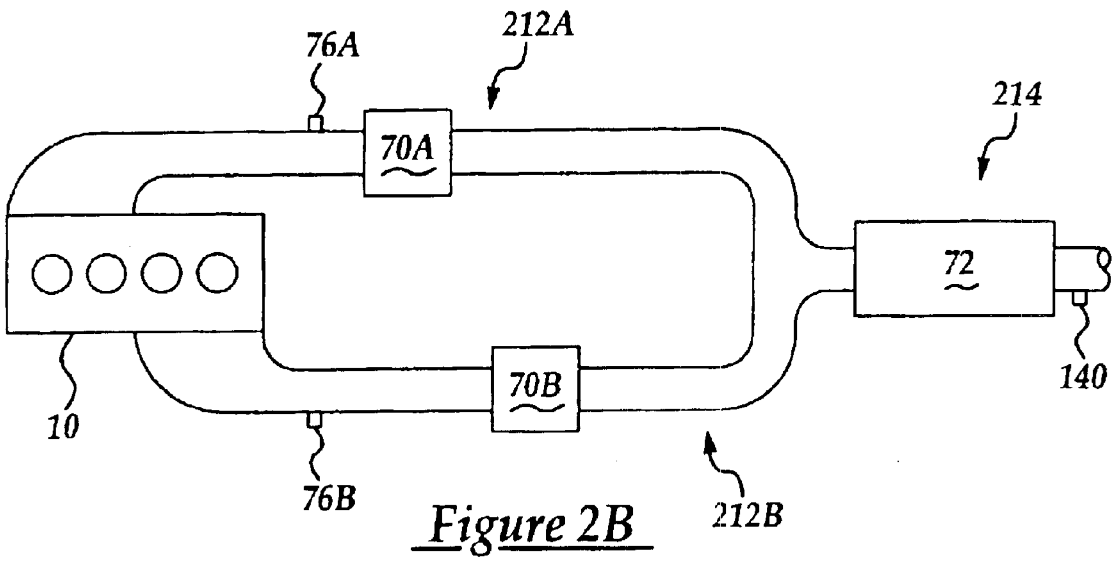
Figure 2C:
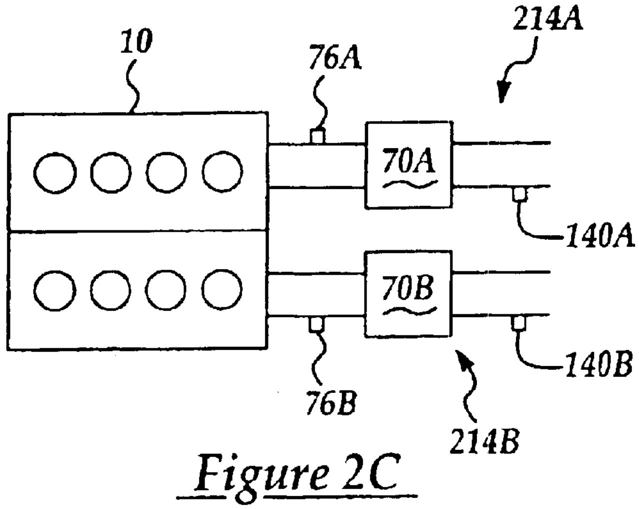

Note that, in FIG. 1, only a single engine cylinder (of a multi-cylinder engine) is shown having only a single exhaust path. To more fully describe the exhaust system, the block diagrams of FIGS. 2A–C can be utilized. Referring now to specifically to FIG. 2, a simplified block diagram describing example exhaust systems according to one aspect of the present invention is illustrated.

Further, FIG. 1 shows a driver's foot 180 interacting with the vehicle pedal 182. The degree of actuation is measured by sensor 184 providing signal (PP) to controller 12.

Referring now specifically to FIG. 2A, engine 10 is shown in this example as a V6 type engine. Note that the number of cylinders, and the configuration (e.g., V type, I type, etc.) can be changed or modified to include 4 cylinder engines, 6 cylinder engines, 8 cylinder engines, 10 cylinder engines, 12 cylinder engines, 5 cylinder engines, or any other suitable number. For example, an I4 type engine can be utilized where two cylinders are grouped to one exhaust path, and the other two cylinders are grouped to another exhaust path.

Continuing now with FIG. 2A, engine 10 is shown having two exhaust paths 210A and 210B, respectively. Path 210A includes upstream catalyst 70A, and downstream catalyst 72A. Further, path 210B includes upstream catalyst 70B, and downstream catalyst 72B. Note that this simplified block diagram does not include all engine and exhaust components such as, for example, exhaust gas sensors, mufflers, and various other devices. Exhaust gas oxygen sensors 76A, 76B and 140A, and 140B are also shown. Note that sensor 140 could be moved between the catalysts, if desired, or between bricks in either device 70 or 72.

Referring now to FIG. 2B, an alternative configuration is shown. In this particular example, an I4 type engine is selected for illustration purposes and shown as engine 10. However, just as above with regard to FIG. 2A, any suitable type engine can be selected and divided into at least two cylinder groups. FIG. 2B shows the first and second exhaust paths 212A and 212B, respectively, converging to a single exhaust path 214. Upstream catalyst 70A is in path 212A, while upstream catalyst 70B is in path 212B. Further, downstream catalyst 72 is in path 214.

In FIG. 2C, engine 10 is exemplified by a V8 type engine. However, as described above, any suitable type engine can be utilized. Further, FIG. 2C shows first and second exhaust paths 214A and 214B, respectively. Catalyst 70A is shown in path 214A, while catalyst 70B is shown in path 214B.

Figure 3A:
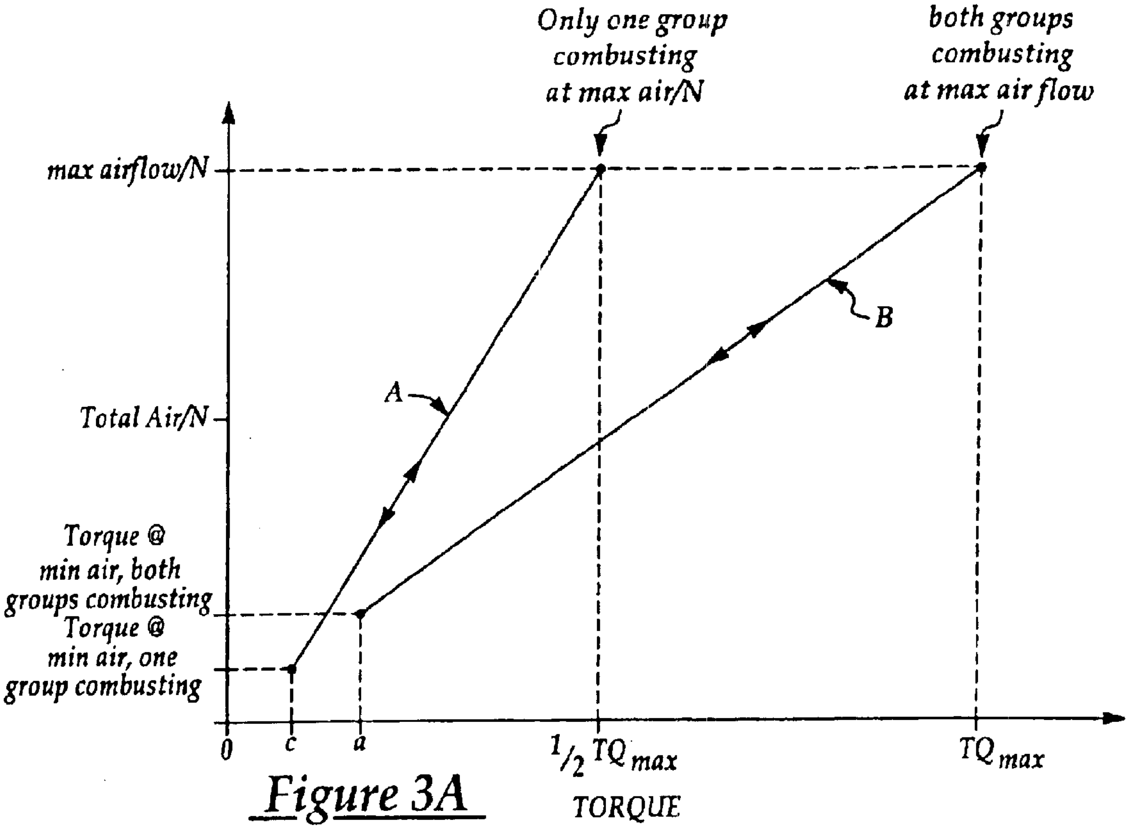
FIGS. 3A–B and 5 show various graphs illustrating aspects of an example embodiment of the invention.

Referring now to FIG. 3A, a graph is shown illustrating a configuration where engine 10 is divided into a first and second cylinder group, each having a separate exhaust path as illustrated in any of the examples of FIGS. 2A through 2C. FIG. 3A illustrates two operating modes (A, B). In mode A, the engine operates with the first cylinder group combusting air and fuel, and the second group simply pumping air without injected fuel. Operating mode B includes both cylinder groups combusting air and fuel. Note that in the particular graphs of FIG. 3A, the engine 10 is divided into two equal cylinder groups (i.e., each cylinder group having an equal number of cylinders); however, such equal division is just one example, and unequal cylinder groups could also be used.

Note that in FIG. 3A, operating mode A allows a lower engine torque production given a minimum allowed air per engine speed (e.g., air per stroke). As will be described below, the present invention advantageously uses both modes A and B to provide a lower available minimum torque capacity, while at the same time improving fuel efficiency and maintaining regulated emissions.

Figure 3B:
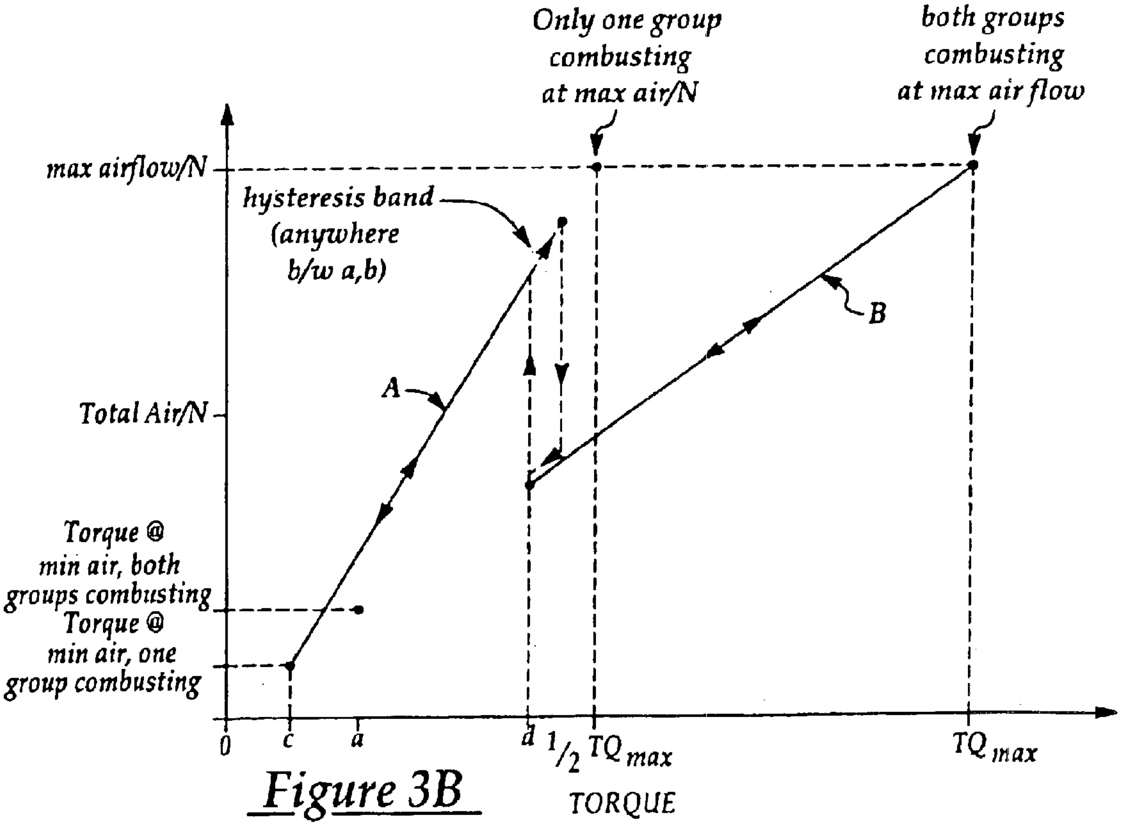

FIG. 3B shows a particular operating strategy utilizing modes A and B, with a transition between modes A and B (as illustrated by the dash lines and labeled the hysteresis band). The transition between mode A and mode B can occur at any engine torque position between a and b. Note that the hysteresis band illustrated in FIG. 3B is just one particular example, and could be positioned at a lower or higher torque value, and could also be set wider than that illustrated in FIG. 3B.

Operation according to the prior art, where all cylinders are deactivated together, results in operation only along mode B, with no available operation below point a, unless ignition timing retard or lean operation is utilized. However, spark retard causes reduced fuel economy and lean operation can cause increased NOx emissions. As such, according to the present invention, it is possible to provide addition torque operation from point c to point a, wherein torque can be controlled/adjusted by controlling airflow (to only the operating group, or to both groups). Furthermore, by operation according to the present invention, it is possible to provide increased fuel economy in operation from point a to point d by operating in mode A rather than mode B. In other words, the air amount that would be required to provide the desired engine output from points c to a, with both cylinder groups operating, would be less than the engine misfire air amount limit. But, by operating in the region from points c to a with one cylinder group combusting air and injected fuel, and the other pumping air without injected fuel, it is possible to operate above the engine airflow misfire limit.

Regarding FIGS. 2A–2C, as described above, the engine controller selectively deactivates a cylinder group(s) and controls engine torque via airflow provided to the operating cylinder group(s). However, the controller can alternative between which cylinder group(s) is disabled to provide more even cylinder/engine/exhaust system wear.

Figure 4:
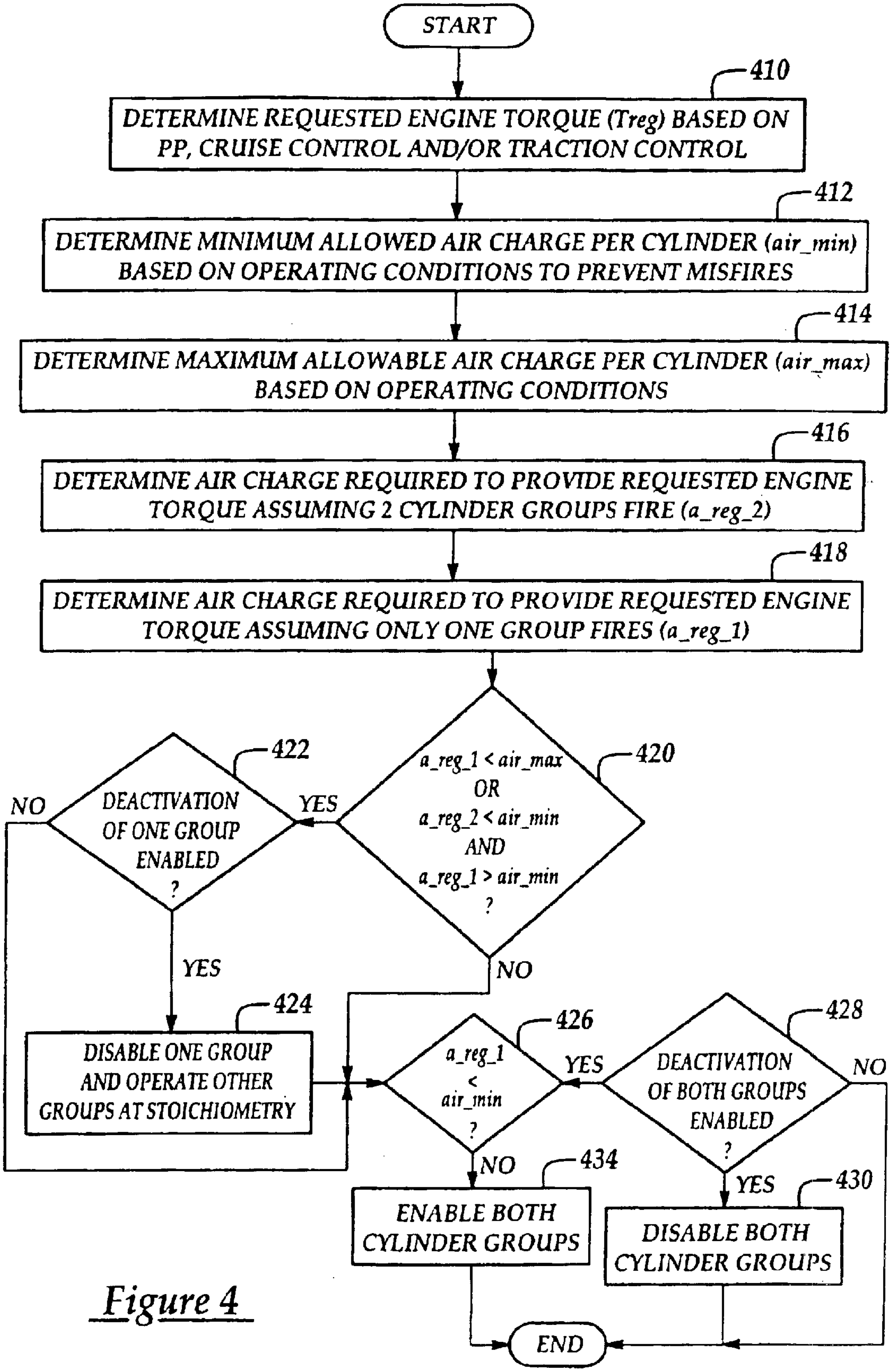
FIG. 4 is a high level flowchart illustrating operation according an example embodiment of the invention.

Referring now to FIG. 4, a routine is described for controlling engine operation, and more particularly for controlling engine operation during vehicle deceleration. During deceleration, the engine is operated in a mode where the engine is operated at a low load to generate a low torque to maintain a good drivability with controlled deceleration. The lowest torque that the engine can be operated at during this mode is limited by the misfire limit of the engine. Typically, the engine has to be operated above a load of about 0.15 to reduce low load misfires. (Note: the limit can vary depending on operating conditions such as temperature, etc.) This low load limit restricts the lowest torque that can be generated during this mode. One way to reduce the engine torque output under the minimum load constraint is to operate the engine with only some of the cylinders firing while the remaining cylinders pumping air without injected fuel. However, in a system that is to maintain stoichiometric operation with a three-way catalyst (TWC), when only some cylinders are fired, the air from the non-firing cylinders makes the exhaust air-fuel ratio lean and also saturates the exhaust system with oxygen. Under these conditions, the TWC has a degraded NOx conversion efficiency and hence the NOx coming from the firing stoichiometric cylinders may not be reduced. This can cause large NOx emissions.

As such, in multi-group engines with a multi-group exhaust system, the engine can be operated at stoichiometric on one group (Stoic Group), and fuel-cutout on the other bank (Air Group). By operating the engine in this manner, the stoichiometric exhaust from the firing bank (Stoic Group) will pass through the TWC and the NOx (and HC/CO) is substantially reduced by the three-way catalytic ability of the catalyst. Since there is no exposure to the significantly lean exhaust (excess oxygen), the TWC performs NOx conversion efficiently. The group that is operated with fuel-cutout (Air Group) gets exposed to air with minimal emissions.

Referring now specifically to FIG. 4, the routine first determines in step 410 a desired engine torque (Treq) based on pedal position (PP), vehicle speed, and gear ratio, representing a driver request. The desired engine torque can also be determined from a cruise control system that maintains a desired vehicle speed set by the vehicle operator. Further, a torque request from a traction control, or vehicle stability control system can be used.

Next, in step 412, the routine determines a minimum allowed air charge (air_min) per cylinder based on operating conditions (e.g., engine speed, air-fuel ratio, engine coolant temperature) to prevent engine misfires. As an alternative, this value can be set to 0.15, for example. Then, in step 414, the routine determines a maximum allowable air charge per cylinder based on operating conditions (air_max).

Next, in step 416, the routine determines the air charge required to provide the requested engine torque assuming two cylinder groups are combusting air and injected fuel (a_req_2). In step 418, the routine determines the air charge required to provide the requested engine torque assuming only one cylinder group is combusting air and injected fuel (a_req_2). Note that steps 416 and 418 are shown for the configuration of a dual bank (dual group) engine where each cylinder group is coupled exclusively to a three-way catalyst. The routine can be modified to include addition modes for additional cylinder groups, or modified to account for unequal cylinder group sizes.

Continuing with FIG. 4, in step 420, the routine determines whether (a_req_1 is less than air_max OR a_req_2 is less than air_min), and whether air_req_1 is greater than air_min. In other words, the routine determines whether the requested torque can be provided by utilizing only one cylinder group to carry out combustion, with the remaining cylinder group(s) operating without injected fuel. In an alternative example, an addition determination can be made in before step 420 (but after step 418) as to whether the vehicle is in a deceleration condition. If so, the routine continues to step 420. If not, the routine simple bypasses cylinder deactivation. Deceleration can be detected based on measured vehicle speed and pedal position (PP). For example, the routine can determine whether the pedal position is less than a threshold value and vehicle speed is decreasing. If so, deceleration conditions can be detected.

Continuing with the routine of FIG. 4, when the answer to step 420 is YES, the routine continues to step 422. In step 422, the routine determines whether deactivation (fuel-cut) of one cylinder group is enabled based on engine operating conditions such as, for example, time since engine start, vehicle speed, engine speed, engine coolant temperature, exhaust gas temperature, and catalyst temperature. For example, if catalyst or exhaust gas sensor temperature becomes too low, cylinder deactivation is not enabled or disabled, if already enabled.

When the answer to step 422 is YES, the routine continues to step 424 and disables one cylinder group and operates the remaining cylinder group(s) at stochiometry and adjusts airflow to provide the desired engine torque. Note that in the configuration described in FIGS. 1–2, only a single throttle is utilized to control airflow to both cylinder groups. However, since one cylinder group is not combusting air and injected fuel, torque effects from that cylinder group are minimal (generally, only friction torque remains).

When the answer to either steps 422 or 420 is NO, and from step 424, the routine continues to step 426. In step 426, the routine determines whether a_req_1 is less than air_min. In other words, the routine determines whether the required airflow is less than the minimum air that can be combusted in the remaining combusting cylinders even when one cylinder group is disabled.. When the answer to step 426 is YES, the routine continues to step 428. In step 428, the routine determines whether deactivation of both cylinder groups is enabled based on engine, operating conditions such as, for example, time since engine start, vehicle speed, engine speed, engine coolant temperature, exhaust gas temperature, and catalyst temperature. For example, if catalyst or exhaust gas sensor temperature becomes too low, cylinder deactivation of both groups is not enabled or disabled, if already enabled.

When the answer to step 428 is YES, the routine continues to step 430 and disables both cylinder groups. Then, from step 430, or when the answer to step 428 is NO, the routine ends.

When the answer to step 426 is NO, the routine continues to step 434 to enable both cylinder groups.

In this way, accurate engine torque control is provided for low engine operating torques as low as point c of FIGS. 3A, B.

Note that, if the engine is operating in mode B at low torques for due to operating conditions (e.g., to maintain catalyst temperatures, exhaust gas oxygen sensor temperatures, . . . etc.), this is the reason for determining in step 420 whether air_req_2 is less than air_min. In other words, even here, it may be desirable to deactivate a cylinder group to maintain accurate torque control at the expense of decreased-catalyst temperature. (E.g., in an alternative embodiment, the determination of a_req_2<air_min can be done separately in one cylinder group disabled irrespective of whether deactivation is enabled via step 422).

Note also that when enabling the cylinder groups, TWC regeneration can be utilized. Specifically, when the engine exits out of fuel-cut mode, the TWCs (Close Coupled TWC 70 and Under Body TWC 72, in this example) on the Air-Group are regenerated by running the engine rich for a short duration to remove the stored oxygen and restore the NOx conversion efficiency of the catalyst.

Figure 5:
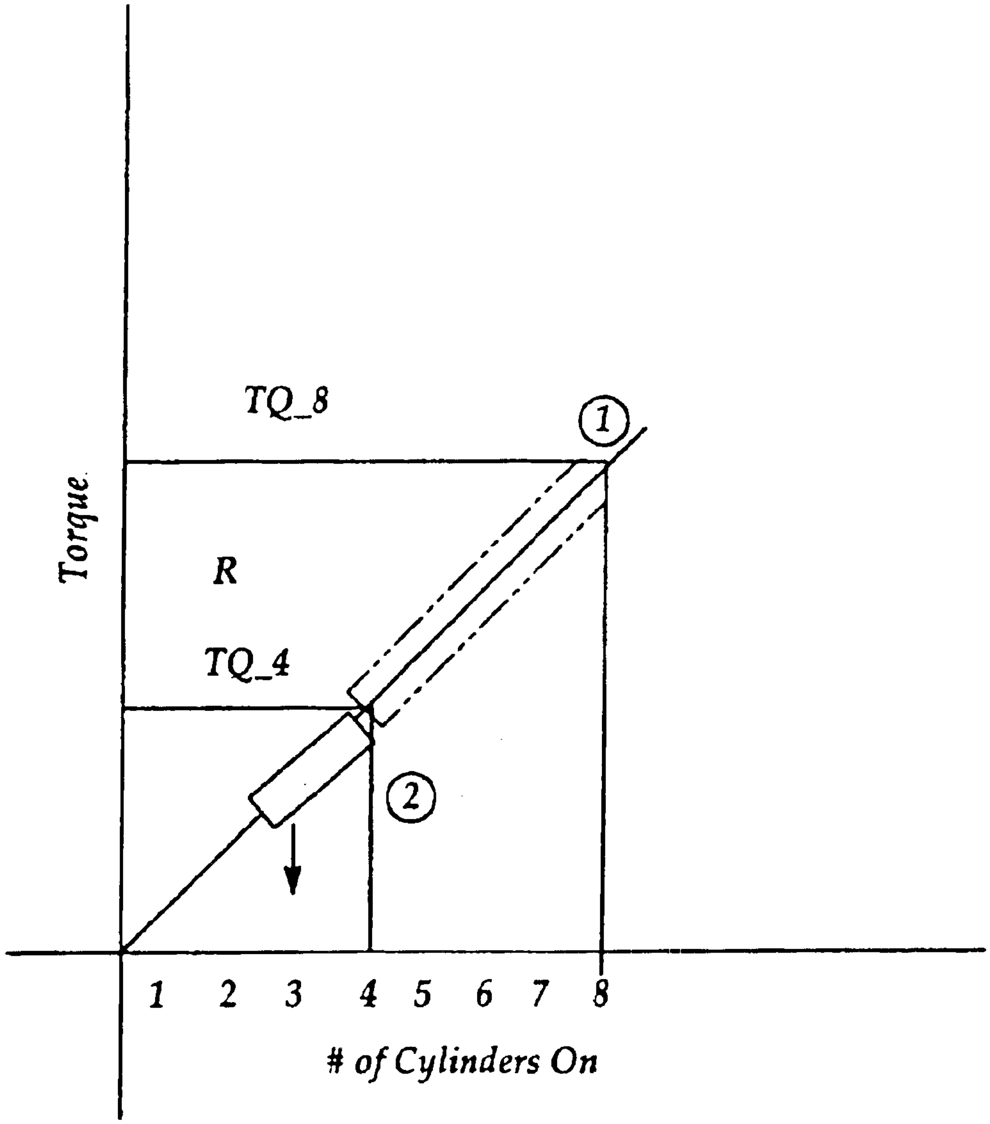

FIG. 5 shows the engine torque output during operation according to an example implementation of the present invention at the misfire load limit for an 8-cylinder engine. TQ_8 is the torque when all the 8-cylinders are operating at stoichiometry and TQ_4 is the torque when only one group, i.e., 4-cylinders on one bank, are operating at stoichiometry and the other bank is in the fuel-cutout mode. By operating the engine with one bank shutoff, the engine output torque is reduced from TQ_8 to TQ_4, which is ½ of TQ_8. The torque can be increased to go from TQ_4 to TQ_8 by increasing the load to a value above the misfire limit of 0.15. In lean-burn systems, the torque can be reduced to below TQ_4 (represented by region R) by operating the engine lean. In stoic systems, the torque can be reduced to below TQ_4 (region R) by retarding the spark. However, retarding spark causes F.E. penalty and could be used only for minimal torque reduction for drivability.

As will be appreciated by one of ordinary skill in the art, the routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

We claim:

1. A system for an internal combustion engine of a vehicle, said engine having at least a first and second group of cylinders, said system comprising:

a first emission control device coupled exclusively to said first group of cylinders;

a second emission control device coupled exclusively to said second group of cylinders;

a third emission control device coupled downstream of both said first and second emission control devices;

a controller for operating in a first mode with both cylinder groups combusting air and injected fuel, the engine producing a first range of engine output during said operation in said first mode; and operating in a second mode with said first cylinder group combusting air and injected fuel and said second cylinder group pumping air without injected fuel, with the engine producing a second range of engine output, with at least a portion of said second range being at a lower output than a lower end of said first range.

2. The system of claim 1 where said second mode is carried out during a deceleration condition of the vehicle.

3. The system of claim 2 where said first and second emission control devices are three way catalysts.

4. The system of claim 3 further comprising an electronically controlled throttle plate.

5. The system of claim 4 wherein said controller further adjusts position of said electronically controlled throttle plate to control engine airflow.

6. The system of claim 1 wherein said engine output is an engine torque output.

7. The system of claim 1 where said second mode includes operation in a region where an air amount that would be required if both cylinder groups were combusting would be less than an engine misfire air limit.

8. A system for an internal combustion engine of a vehicle, said engine having at least a first and second group of cylinders, said system comprising:

an emission control device coupled to both said first and second group of cylinders, said device including a NOx trap;

a controller for operating in a first mode with both cylinder groups combusting air and injected fuel, the engine producing a first range of engine torque output during said operation in said first mode; and operating in a second mode with said first cylinder group combusting air and injected fuel and said second cylinder group pumping air without injected fuel, with the engine producing a second range of engine torque output, with at least a portion of said second torque range being at a lower torque output than a lower end of said first torque range, said second mode being carried out at least during a deceleration condition of the vehicle.

9. The system of claim 8 further comprising a fuel injector for directly injecting fuel into the engine.

10. The system of claim 8 further comprising an electronically controlled throttle plate.

11. The system of claim 10 wherein said controller further adjusts position of said electronically controlled throttle plate to control engine airflow.

12. The system of claim 8 wherein said engine output is an engine torque output.

13. The system of claim 8 where said second mode includes operation in a region where an air amount that would be required if both cylinder groups were combusting would be less than an engine misfire air limit.

* * * * *